United States Patent [19]

Sarraf et al.

[11] Patent Number: 5,241,328
[45] Date of Patent: Aug. 31, 1993

[54] APPARATUS AND METHOD FOR THERMAL PRINTING OF FINELY DETAILED IMAGES OF PHOTOGRAPHIC QUALITY

[75] Inventors: Sanwal P. Sarraf, Webster; John M. Kresock, Elba, both of N.Y.

[73] Assignee: Eastman Kodak Company, Rochester, N.Y.

[21] Appl. No.: 763,384

[22] Filed: Sep. 20, 1991

[51] Int. Cl.$^5$ ................................................ B41J 2/48
[52] U.S. Cl. .................... 346/76 L; 358/298
[58] Field of Search ............ 346/76 L, 107 R, 1.1, 346/108, 160, 76 PH, 1.1; 358/298

[56] References Cited

U.S. PATENT DOCUMENTS

| | | | |
|---|---|---|---|
| 4,541,042 | 9/1985 | Kohashi | 346/76 |
| 4,626,923 | 12/1986 | Yoshida | 353/283 |
| 4,661,859 | 4/1987 | Mailloux et al. | 358/283 |
| 4,679,057 | 7/1987 | Hamada | 346/76 |
| 4,691,211 | 9/1987 | Brownstein | 346/76 |
| 4,763,199 | 8/1988 | Suzuki | 358/280 |
| 4,800,399 | 1/1989 | Long et al. | 346/76 |
| 4,811,037 | 3/1989 | Arai | 346/108 |
| 4,831,392 | 5/1989 | Dei | 364/519 |
| 4,847,654 | 7/1989 | Honma et al. | 358/300 |
| 4,847,695 | 7/1989 | Arai | 358/455 |
| 4,864,326 | 9/1989 | Kawamura et al. | 346/108 |
| 4,870,499 | 9/1989 | Suzuki et al. | 358/443 |
| 4,905,023 | 2/1990 | Suzuki | 346/108 |
| 4,926,268 | 5/1990 | Kawamura et al. | 358/458 |
| 5,066,962 | 11/1991 | Sarraf | 346/76 L |
| 5,105,206 | 4/1992 | Sarraf et al. | 346/76 L |
| 5,164,742 | 11/1992 | Baek et al. | 346/76 L |
| 5,183,798 | 2/1993 | Sarraf et al. | 503/227 |

Primary Examiner—Mark J. Reinhart
Attorney, Agent, or Firm—Robert L. Randall

[57] ABSTRACT

There are disclosed an apparatus and a method for thermal printing by dye transfer of a high definition image on a receiver element such as a full color slide transparency. This new thermal printing apparatus includes a laser, means to scan a finely focused spot of light from the laser along a line, means to position a dye donor element and a closely adjacent receiver element (side transparency) to be scanned by the laser light spot, and laser drive and control logic (LDCL) means for turning the laser full-on to an optimum power level for a time determined by high speed print data in the form of data words. The method according to the invention includes the step of applying to a dye donor element thermal energy from a laser at a power level at which the dye ablates rather than sublimes. The laser is driven at an optimum power-on level and the length of time the laser is on determines the amount of dye transferred to a receiver element as a dye pixel. This substantially improves the linearity of tone scale of the dye pixels printed on the receiver element over a wide range of exposures and densities. A slide transparency image made in this way nearly equals and, in some cases, may exceed the visual quality of an image made by photography.

22 Claims, 4 Drawing Sheets

APPARATUS AND METHOD FOR THERMAL PRINTING OF FINELY DETAILED IMAGES OF PHOTOGRAPHIC QUALITY

FIELD OF THE INVENTION

The present invention relates to an apparatus and a method for the thermal printing of a finely detailed image, such as in a full color slide transparency, which has improved linearity in tone scale compared to previous images of this kind.

BACKGROUND OF THE INVENTION

In a thermal printer such as described in U.S. Pat. application Ser. No. 457,593, filed Dec. 27, 1990 in the names of S. Sarraf, et. al., and assigned to the same assignee of the present patent application, there is described a system which uses the heat energy of a laser beam to print a finely detailed image onto a receiver element, which for example is a slide transparency. The printed image, which should be as faithful as possible to an original or master image, is printed as a series of dots or pixels by scanning the laser beam a line at a time across a dye donor element held by vacuum against a blank slide transparency or receiver element. The laser beam is rapidly modulated in intensity by input data corresponding to the master image and "spots" or pixels of dye, corresponding to the pixels of the master image, are transferred by thermal energy from the dye donor element onto the slide transparency. To obtain sufficiently high resolution, such as is needed in photographic slide transparencies to give a desired degree of sharpness in the projected image (e.g., at 100 power magnification), the dye pixels are very small (e.g., only about 7 microns) and are written at a very close pitch, for example, about 4000 dots per inch. They are written at a high speed (e.g., 140 KHZ) since otherwise the printing of the entire image takes an inordinately long time.

As explained above, for a thermally printed reproduction of a master image to be suitable for viewing at projection magnification (e.g., 100 power), it is necessary that the individual pixels of the printed image be very small and very accurately positioned. And it is also highly desirable that the individual pixels each have a density or tone value corresponding as closely as possible to the respective densities of the pixels of the master image. If otherwise, the tones and contrast of the printed image are distorted to a greater or lesser degree and visual quality of the image is degraded.

In the kind of thermal dye-transfer imaging described above, there is employed a dye donor element in the form of a thin sheet of material having a thermally reactive dye on one surface. Such a donor element is disclosed in U.S. Pat. No. 4,973,572 and assigned to the same assignee of the present patent application. The donor element is placed with its dye coated surface closely adjacent (e.g., about 8 microns distant) to a receiver element, such as a blank slide transparency. Then the donor element is "scanned" by a laser beam focused on the back of the element to a very small spot of light (e.g., about 6 microns). As the laser spot is linearly scanned across the donor element, the laser is electronically modulated in intensity at very high frequency to provide greater or lesser heat energy in the focused light spot. The thermal energy in a light spot passing through the donor element causes the dye, over the area of the spot, to ablate or to sublime to a greater or lesser degree depending on the heat energy content of the light. The dye thus removed in the area of the light spot transfers as a dot or pixel of dye printed onto the receiver element (slide transparency). The density of such a transferred dot of dye is a function of the thermal energy absorbed through the donor element into the dye from the light spot.

It has been found that the density of a pixel of dye in a thermal printer of this kind after being printed on the receiver element is not linearly related to the intensity of the laser beam spot. As a result, the tone scale of the printed image is not a linear reproduction of the tone scale of the master image. This results in a degradation of the visual quality of the printed image, especially when viewed at projection magnification. Moreover, attempts to improve the linearity of tone scale have been frustrated by minor variation in the thermal reactivity of the dye over the surface of a donor element or variations from one dye donor element to another. Thus steps taken to improve the linearity of tone scale as printed by an intensity modulated laser have not been fully successful. Furthermore, there are certain inherent non-linearities in the operation of a laser which make doubly difficult the control of its intensity and focusing of its light spot as used in a thermal printer such as described above It is desirable to overcome the above described difficulties and limitations and make possible the printing of thermal dye images with substantially improved linearity in tone scale and in full color. Slide transparencies so produced would closely approach or equal in visual quality a photographic color image even when viewed at projection magnification.

SUMMARY OF THE INVENTION

In accordance with one aspect of the invention there is provided an apparatus comprising a laser and an electronic laser drive control and logic (LDCL) circuit for thermally printing from one or more dye donor elements onto a receiver element such as a slide transparency. The electronic LDCL circuit is uniquely configured to be able to drive the laser over a wide range of frequencies with print data "words" whose weighted digital values correspond to the pixels of a master image. The LDCL circuit, in executing each "word" for a pixel immediately drives the laser from a threshold near-on value to an optimum "full-on" condition, and then leaves the laser full-on, for a time corresponding to the weighted digital value of that respective binary word. By way of example, for a word of 8 bits there are 256 different levels or values. A tone scale divided into such a number of discrete values appears visually to be substantially continuous. The full-on power level of the laser is set at an optimum operating point above the level at which dye ablates from a donor element and prints as dye pixels on the receiver element. There is a substantially linear relation between the density of each printed dye pixel on the receiver element and the weighted digital value of the respective data word which drives the laser control circuit. Moreover, this substantially linear relation is still present even though there may otherwise be minor variations in the thermal characteristics of the dye over the surface area of a donor element, or from one donor element to another, or minor variations from one laser to another.

The present invention is directed to a thermal printing apparatus which comprises a laser, means to scan a finely focused spot of light from the laser along a line, means to position a dye donor element and a closely adjacent receiver element (slide transparency) to be scanned by the laser light spot, and laser drive and control logic (LDCL) means for turning the laser full-on to an optimum power level for a time determined by high speed picture data in the form of binary words. An asynchronous load counter in the LDCL means is loaded with each picture data binary word and then under control of a high speed clock "counts" during an interval of time the weighted value of the binary word. This count interval determines the time-on of the laser. A count divider in the LDCL means determines the loading of each binary word into the counter and turns on a drive unit which powers the laser. The drive unit is turned off by the counter at the end of the count interval.

Viewed from another aspect, the present invention is directed to a method of printing an image on a receiver element. The method comprises the steps of: placing a dye donor element closely adjacent to a receiver element (slide transparency); scanning the donor element by finely focused spots of a light beam from a laser to ablate rather than sublime dye pixels from the donor element and print them onto the receiver element; and turning on the laser at a light spot to a full-on optimum power level above the point of dye ablation and leaving the laser full-on at optimum power level for a time linearly related to the weighted value of a print data word corresponding to a respective pixel in a master image, such that the tone scale of the printed dye pixels is substantially linear over a wide range of densities and data words.

It has been found that on the contrary, as the power level of a focused laser spot is variably changed from zero to maximum, as in amplitude modulation, the dye of the donor element sublimes, at a low power level, and then at a transition region, as the power exceeds a certain value, the dye ablates. The point at which sublimation ends and ablation begins gives rise to a non-linearity or "kink" in the tone scale of the transferred or printed pixels of dye. And the point at which ablation of the dye begins varies somewhat over the surface area of the donor element or from one donor element to another. But by virtue of the fact that in accordance with the invention the power-on energy of the focused laser spot is always above the transition point of the dye in going from sublimation to ablation, this "kink" in the tone scale is avoided, and batch to batch variations in donor elements are obviated. A full, nearly linear tone scale of the printed pixels transferred from the donor element to the receiver element is obtained by digitally controlling the time during which the laser is full-on. This substantially improves the linearity of tone scale over a wide range of exposures and densities. Being fully digital, this method obviates non-linearity in conversion to analog control of the laser, as in prior systems. This new method of operation also avoids non-linear power output, astigmatism and spot size variation of the laser as its drive current is variably modulated between threshold and full power, as is the case with intensity modulation of the laser. A picture, such as a slide transparency, made by thermal dye transfer according to the method of the present invention, and which may be in full color, closely approaches in visual quality a picture made by state-of-the-art photography.

A better understanding of the invention, together with its important advantages will best be gained from a study of the following description given in conjunction with the accompanying drawings and claims.

DETAILED DESCRIPTION

Figure 1:
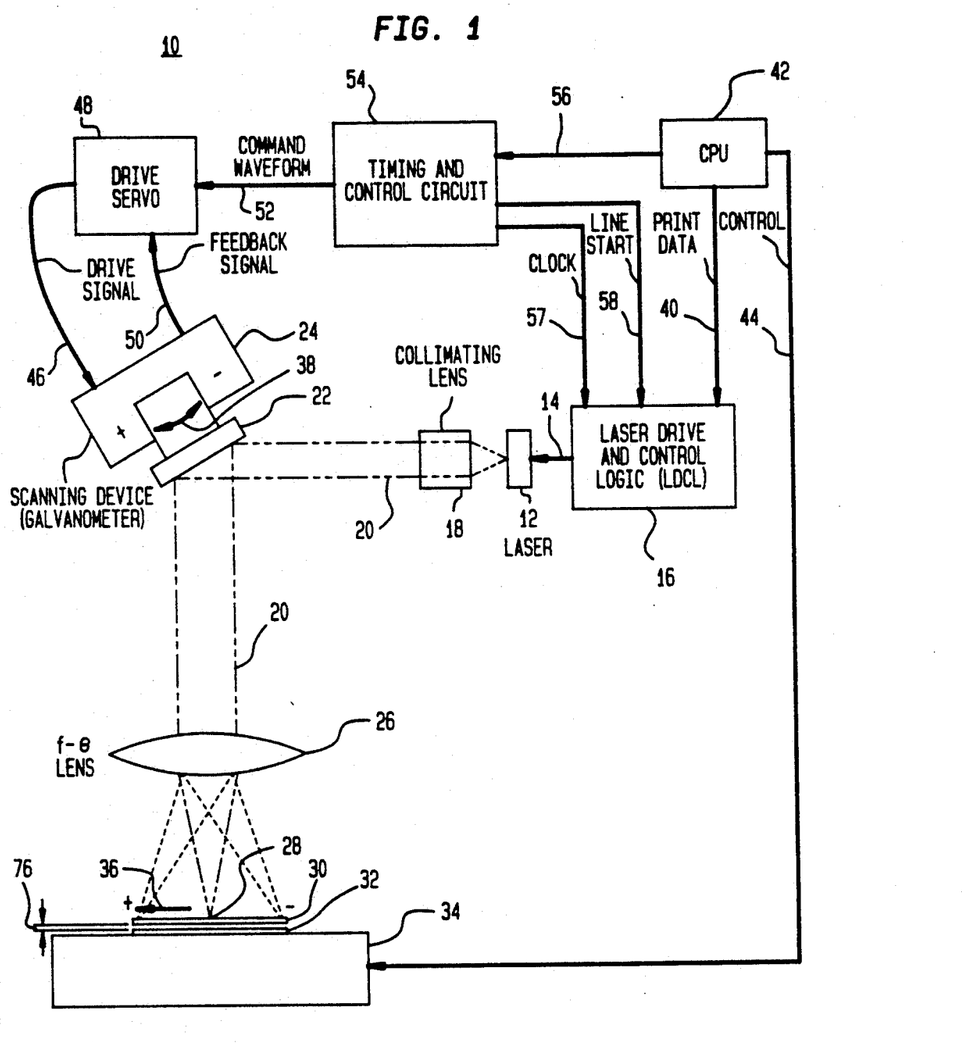
FIG. 1 is a schematic diagram of a thermal dye-transfer laser printer system embodying features in accordance with the invention.

Referring now to FIG. 1, there is shown in schematic form a laser printing system 10 in which the present invention has utility. System 10 comprises a laser 12 which via a lead 14 is energized by a laser drive and control logic (LDCL) circuit 16. The LDCL circuit 16, which is provided in accordance with an aspect of the invention, is described in detail hereinafter. Light emitted from laser 12 is directed to a collimating lens 18 which forms a light beam 20 indicated by the parallel dashed lines. Light beam 20 impinges on a reflecting mirror 22 whose exact angular position is electronically controlled by a scanning device 24. Light beam 20, after reflecting from mirror 22, passes through a f-θ lens 26 which focuses the beam 20 to a very small spot 28 imaged on a dye donor element 30. Positioned closely beneath donor element 30 is a receiver element (slide transparency) 32 which is to be printed on. These elements 30 and 32 are held together and precisely located under light spot 28 by a positioning mechanism 34. The focused light spot 28, which may be only about 6 microns wide, is scanned linearly, a line at a time, across donor element 30, as indicated by the arrowed line 36, when the device mirror 22 is rotated about its axis, as indicated by the dual-arrow curved line 38 from a minus (−) to a (+) position. Print data, in the form of binary words to be printed as pixels on print element 32, is fed via a buss 40 into the LDCL circuit 16 from a central processing unit (CPU) 42 and modulates light beam 20 as it is linearly and synchronously scanned across the donor and receiver elements 30 and 32. CPU 42 is coupled to and controls the positioning mechanism 34 via a control lead 44. Mechanism 34 shifts the donor and receiver elements 30 and 32 sideways relative to the laser spot 28 to the next line position before the beginning of each line scan, and so on.

The scanning device 24, shown here in a rest or center position, is adapted to rotate plus and minus from center by a certain angular deflection, for example ±7.8°. In swinging from negative to positive deflection, the mirror 22 deflects light beam 20 and its focused spot 28 and linearly scans it along a line. Now, where it is desired to print with high resolution (e.g., 4000 pixels per inch or more), it is necessary for the scan or travel of light spot 28 along the donor element 30 in the direction of the arrow 36 to be extremely linear, very fast, and accurate to an exceptionally high degree.

The scanning device 24, is driven by a power signal via a lead 46 from a drive servo 48. A linearizing feedback signal from the device 24 is applied via a lead 50 to the drive servo 48. The drive servo 48 is controlled by a command waveform applied to it via a lead 52 from a timing and control circuit 54. The circuit 54 in turn receives signals via a signal cable 56 from the CPU 42. The timing and control circuit 54 applies clock signals via a lead 57, and applies line start signals via a lead 58 to the LDCL circuit 16. A laser printing system, similar to the laser printing system 10, with the exception of the LDCL circuit 16, is described in detail in U.S. Pat. application Ser. No. 722,753, filed Jun. 28, 1991, in the names of J. M. Kresock et. al. and assigned to the same assignee of the present patent application.

Figure 2:
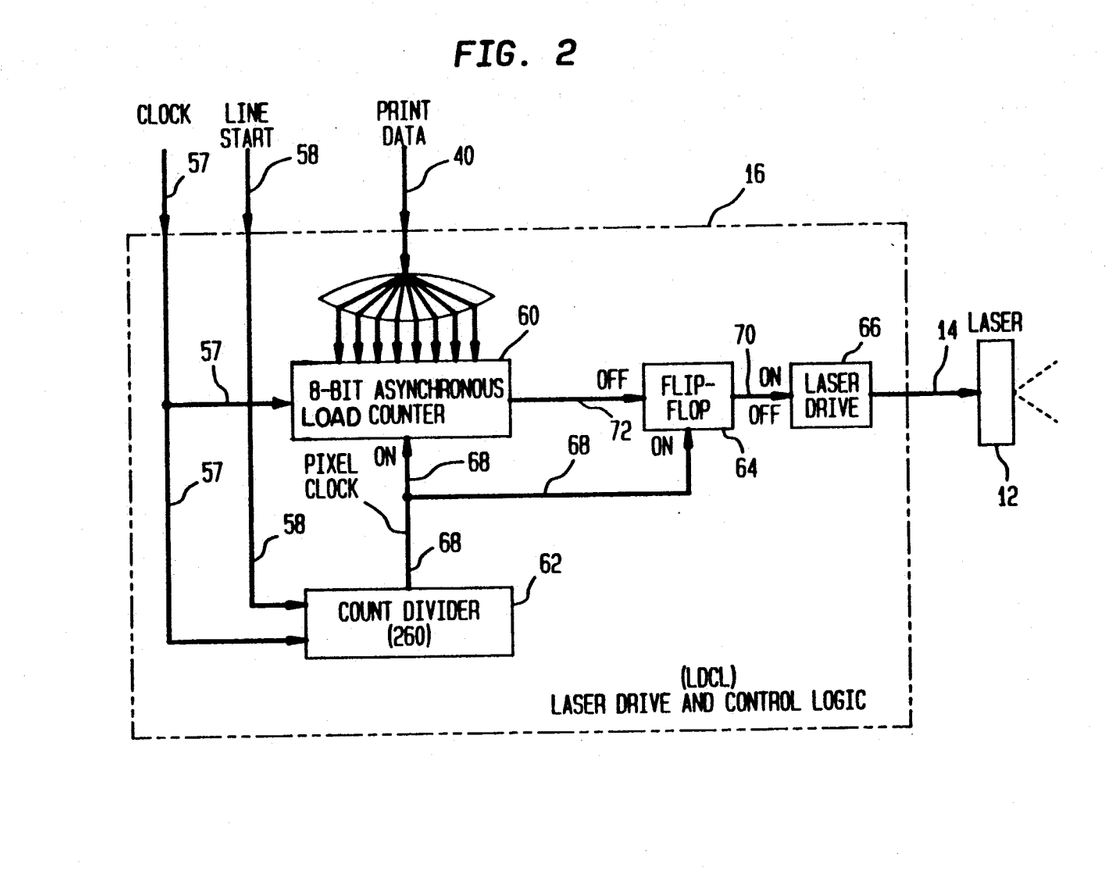
FIG. 2 is a block diagram of an electrical circuit used in the laser system of FIG. 1 and provided according to a preferred embodiment of the invention.

Referring now to FIG. 2, there is shown in block diagram a preferred embodiment of the invention comprising the LDCL circuit 16 (shown within a dashed line rectangle). The LDCL circuit 16 comprises an asynchronous load counter 60, a count divider 62, a flip-flop 64 and a laser drive 66. The laser drive 66 is connected via the lead 14 to the laser 12 (see also FIG. 1), and this controls the laser 12. The LDCL circuit 16 has applied to it via the lead 57 high frequency master clock signals (see also FIG. 1). These clock signals are applied both to the counter 60 and the count divider 62. Line start signals via the lead 58 are applied to the LDCL 16 and the count divider 62 in order to synchronize the printing action of the laser 12 with the beginning of the scanning of the focused light spot 28 as it sweeps along a line on the donor element 30 see (FIG. 1) from a starting or minus position to an ending or plus position as indicated by the arrow 36. Print data, in the form of 8-bit words is applied to the LDCL circuit 16 and to the asynchronous load counter 60 from the CPU 42 via the buss 40.

The count divider 62 counts down or divides the high frequency clock by a suitable amount. For example, the count divider 62 may be set to divide by "260". Thus for 260 clock counts, the count divider 62 produces a single count, termed a pixel clock count. By way of example, for a high speed clock frequency of 36 MHz, dividing by 260 gives a pixel clock of about 140 KHz (138.46 KHz). The pixel clock signals or counts, which are synchronized with the line start signal as previously explained, are applied via a lead 68 to the asynchronous load counter 60 and to the flip-flop (on-off switch) 64. For an 8-bit word of 256 numbers, the count of 260 provides several extra clock intervals, termed "overhead" counts, to compensate for minute delays in the actuation of various elements in the LDCL circuit 16. It is desirable to provide at least one extra count to take care of system "overhead".

A pixel clock signal from the count divider 62 actuates the asynchronous load counter 60 to load into it each 8-bit picture data word. Then on a subsequent clock count, the asynchronous load counter 60 begins a time cycle during which it counts down from the weighted value of the print data word (a decimal number between 255 and 0) to "0". One "overhead" clock count as described above takes care of the starting of the counter 60. The number of high speed clock counts represented by a given binary word determines the "time-on" duration for the laser 12.

Along with the actuation of the asynchronous load counter 60 by a pixel clock count, that same pixel clock count is applied via the lead 68 to the flip-flop 64. This selectively turns the flip-flop 64 "on" and it, via a lead 70, turns on the laser drive 66. The laser drive 66 is set at an optimum, near full power level of the laser 12; so long as the flip-flop is "on", the laser is energized at this optimum power level. When "off" the laser drive 66 holds the laser 12 at its threshold turn-on power level. Because the laser, when "on", is at constant (optimum) power, there is no non-linearity in power level and no variation (astigmatism) in the focused light spot 28 due to such non-linearity. This also means that uncontrollable variations in performance from one printer system 10 to another supposedly identical one are obviated. This is an important manufacturing consideration.

The output of asynchronous load counter 60 is connected via a lead 72 to the flip-flop 70. When the counter in counting the binary word then stored in it reaches "0", the counter 60 applies to the lead 72 an "off" signal which turns off the flip-flop 64, and in turn the laser drive 66. On the occurrence of the next pixel clock count the next print data word is loaded into the asynchronous load counter 60, the flip-flop 64 is turned "on", and then the counter 60 again counts down to "0". Because the counter 60 is asynchronously loaded, it is fully loaded with a print data word before a succeeding high speed clock count starts it down to "0". Because the asynchronous load counter 60 does not have to be synchronized with a particular clock count, this arrangement permits the LDCL circuit 16 to operate over a wide range of high speed clock frequencies, for example over a range from 20 MHz to 80 MHz. Thus greater flexibility in the operation of the laser printer system 10 is made possible while maintaining improved linearity in the tone scale of the images printed.

Figure 3:
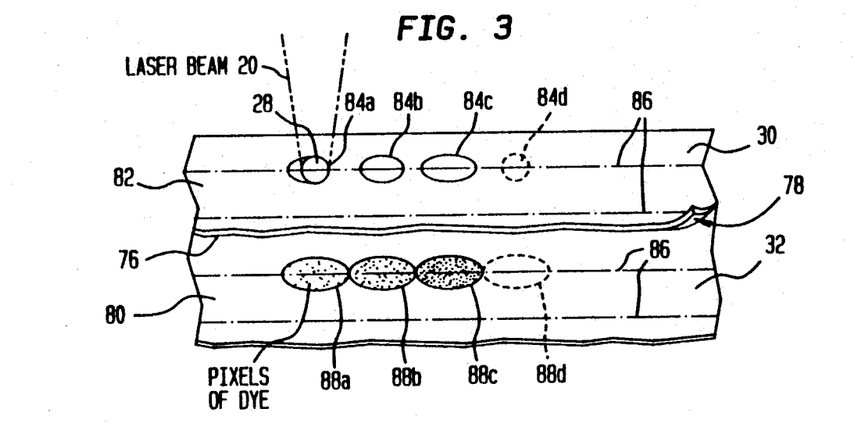
FIG. 3 is a greatly enlarged, partially broken away portion of a dye donor element and a closely adjacent receiver element showing schematically how thermal energy of a laser transfers pixels of dye from the donor to the receiver element.

Referring now to FIG. 3 there is shown greatly enlarged, and partially broken away top view, portions of the dye donor element 30 and the receiver element 32 positioned closely beneath it. The dye donor element 30 is advantageously a thin sheet of plastic, such as tensilized polyester, having a surface coated with a thin layer of a dye material which is thermally reactive and which ablates when heated sufficiently. The receiving element 32 is advantageously a thin piece of plastic such as polycarbonate, having a smooth flat surface on which microscopically small dye pixels can be printed to form a high definition image. A dye donor element and an image receiving element such as these are described in U.S. Pat. No. 4,833,124 which has a common assignee with the present patent application. The two elements 30 and 32 are advantageously separated by a very small distance 76 which for example, is about 8 microns (also see distance 76 in FIG. 1). A dye coated surface 78 of the donor element 30 faces down toward an image receiving surface 80 of the receiver element 32. The two elements 30 and 32 may be held separated, for example by very small beads (e.g. 8 microns dia.) randomly spaced on dye surface 78. The donor element 30 has a top surface 82 which is scanned by the finely focused light spot 28 of the laser beam 20. A series of heat spots 84a through 84c (not to scale) caused by the sequentially imaged and scanned laser-beam 20 are here schematically shown as elongated or oval and as discrete areas lying along one of the laser scanning lines indicated by the dashed lines 86. The laser beam 28 is being turned on and off at high speed as it is being scanned along a line 86. Thus even though the focused light spot 28 may be approximately round, its thermal footprint, illustrated by the heat spots 84a through 84c is elongated. What would be a heat spot explained, the laser is not turned on at this spot. The dashed lines 86 lie side-by-side closely adjacent to each other on a fine pitch as determined by the positioning mechanism 34. As thermal energy is applied to each heat spot 84(a,b,c), a greater or lesser amount of a spot of the dye is ablated off of the surface 78 of the donor element 30 depending on the amount of energy applied to a given heat spot. The dye spot so ablated from surface 78 is transferred as a dye pixel onto the image surface 80 of the receiver element 32. For the sake of simplicity, only four dye pixels are shown (not to scale) as 88a, 88b, 88c and 88d (dye donor element 30 is shown broken away here so as to expose these particular pixels). It is understood that the heat spots (similar to the heat spots 84a-d) which are used to generate these pixels are part of the donor element 30 which has been broken away. The dye pixels 88a, 88b, 88c and 88d are shown as touching and are slightly larger than their corresponding heat spots because of ablation of the dye and because of a slight spreading out of the thermal energy of a heat spot as this energy is transmitted through the donor element 30 and applied to the dye on its lower surface 78.

Figure 4:
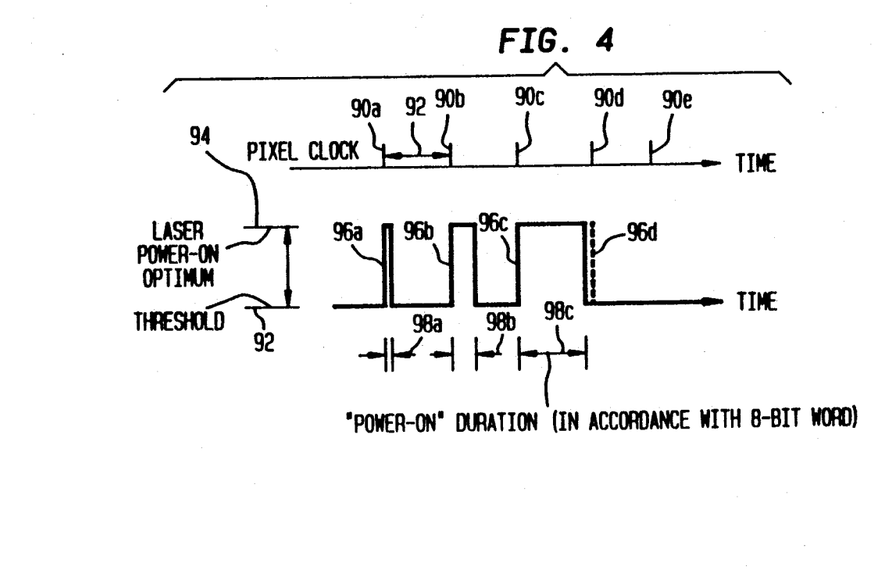
FIG. 4 shows how in accordance with the invention the laser energy is controlled to obtain substantially linear density or tone scale in the dye pixels printed on the receiver element.

Referring now to FIG. 4, there are shown a series of pixel clock counts 90a through 90e having a time spacing or period indicated by the arrow 92. As was explained above, the count divider 62 (see FIG. 2) determines the number of high speed clock counts during each period 92 (e.g., 260). Each pixel count period 92 determines the "length" of a dye pixel 88a, 88b, 88c, or 88d (see FIG. 3). Thus dye pixel 88a nominally begins at the pixel count 90a and ends at the pixel count 90b, and so on. There is also shown in FIG. 4 the relation of the pixel counts 90a through 90e to the times during which the laser beam 20 is turned on and off. The power applied to the laser 12 is shown in FIG. 4 as being either at a threshold turn-on level indicated at 92, or at a power-on optimum level indicated at 94. When pixel count 90a occurs, if by way of example the weighted value of the binary word then stored in asynchronous load counter 60 is near "0", the counter 60 runs for only a short time and then turns the laser 12 off. Because of the thermal time constant of the donor element 30, there is a threshold time (e.g., about 1.3 microsecond) that the laser 12 must be on before dye begins to ablate from the surface 78 of the donor element 30. Such a condition is illustrated by the narrow pulse 96a having a duration shown as 98a (slightly longer than the threshold time). This produces a dye pixel of near minimum density as illustrated by the lightly shaded dye pixel 88a in FIG. 3. If on the next pixel count 90b in FIG. 4 the binary word is larger, resulting in a longer count duration, the laser 12 is turned on for a longer time, illustrated by the wider pulse 96b, whose duration is shown as 98b. The corresponding dye pixel 88b has a proportionally higher density, indicated by heavier shading. Similarly, for a near maximum count duration illustrated by the still wider pulse 96c, with a duration shown as 98c, the dye pixel 88c has near maximum density as indicated. If at a pixel count 90d, the print data word count is "0", the laser 12 is not the corresponding dye pixel 88d has a "0" density (no shading) and is shown in dashed outline. The absence of a corresponding heat spot is indicated by the dashed outline of the spot 84d in FIG. 3.

Figure 5:
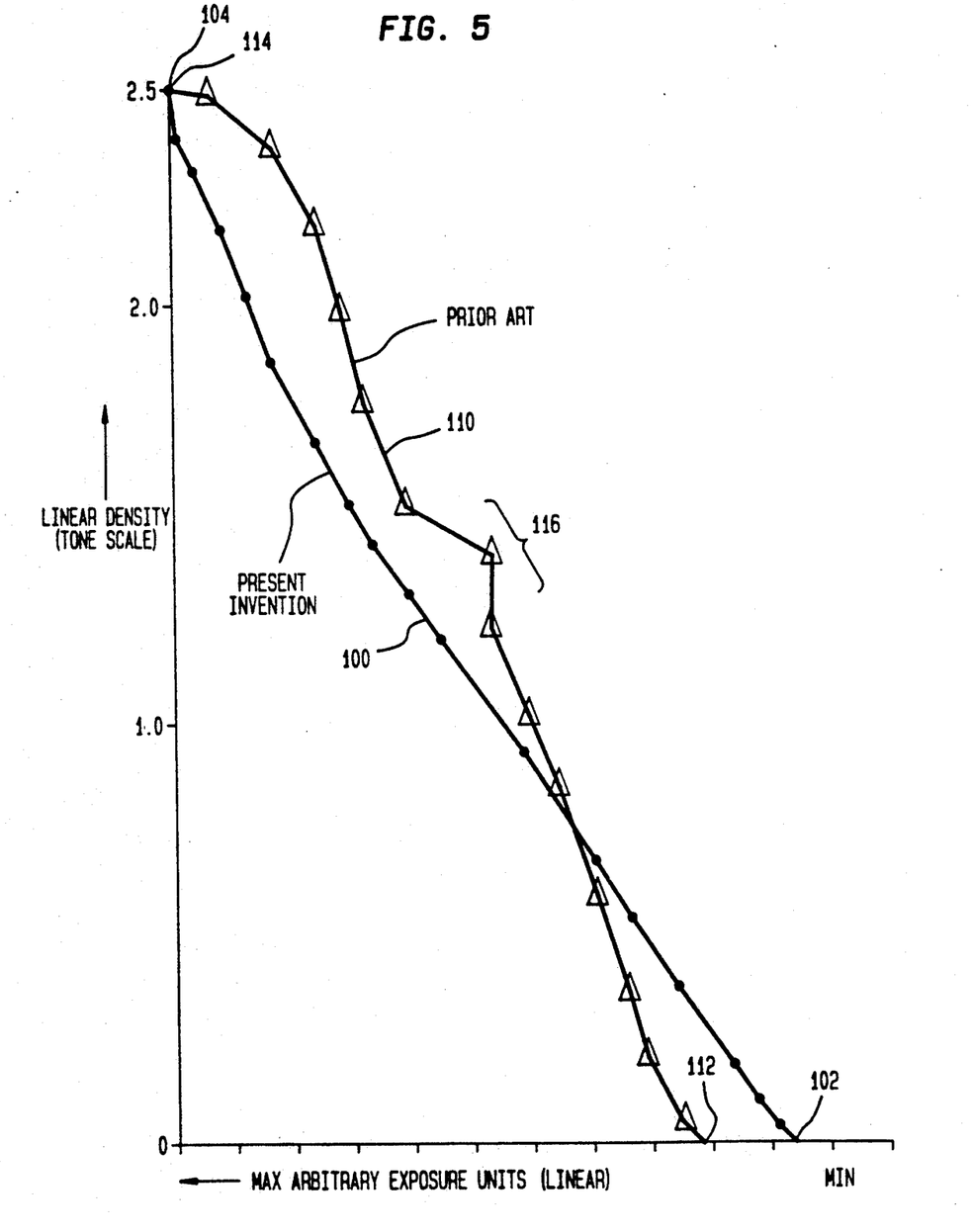
FIG. 5 is a graph showing the substantially improved linear tone scale of the dye pixels as printed on the receiver element in accordance with the present invention and also showing by comparison the distorted tone scale obtained in accordance with the prior art.

Referring now to FIG. 5, there is shown a graph whose vertical axis is in linear units of density as measured by a laboratory-standard densitometer and whose horizontal axis is in arbitrary, linear "exposure" units corresponding to the laser power-on durations as determined by the picture data words from maximum count to zero count. A line 100 on the graph shows the actual measurements of the respective densities of the dye pixels 88 versus the various laser power-on durations 98 which in turn are linearly related to the print data words. It will be seen that line 100 is substantially linear and extends from a point 102 of minimum exposure with zero density, to a point 104 of maximum exposure at a maximum density value of 2.50 units. The measured values plotted along the line 100 show that by virtue of the present invention a substantially continuous, linear tone scale of the microscopically small printed dye pixels 88 is obtained over a wide range of exposures and densities. Moreover, the results are substantially uniform throughout a dye donor element, and from one element to another, as well as from one laser printer 10 to another supposedly identical one. Thus by virtue of the invention, thermally printed images are obtained which closely approach and in some cases exceed the visual quality (sharpness, linearity of tone scale, etc.) of an image made by state-of-the-art photographic means.

The graph of FIG. 5 also shows for the sake of comparison, a line 110 giving the exposure versus density of dye pixels similar to pixels 88 but printed in accordance with prior art control of a laser 12. In this prior art system the laser was amplitude or intensity modulated in accordance with the weighted value of a picture data word. The same laser 12 (but with different logic and control circuitry) and the same kind of dye donor and receiver elements 30 and 32, along with other elements of the thermal printer 10, and otherwise under the same conditions, were used in printing the dye pixels from which were obtained the exposure versus density measurements plotted along the line 110. This prior art line 110 extends from a point 112 of zero density and minimum exposure to a point 114, which coincides with the point 104 of line 100, of maximum density and maximum exposure. It will be noted that the line 110 is substantially less linear in certain regions than the line 100 (obtained in accordance with the present invention). There is also a "kink" at a region 116 near the center of the line 110. This is thought to be due to the thermal reaction of the dye on the donor surface 78 of the donor element 30 in changing from subliming to ablating as the laser power level is increased. It will also be noted that the point 112 on the line 110 lies to the left of the point 102 on the line 100 indicating that a wider exposure latitude is obtained by operating the laser 12 in accordance with the present invention. While not shown here, it has also been found that when the laser 12 is operated at an intermediate, but constant power level above zero power yet well below optimum full-on power and then scanned along a line 86 of a given dye donor element 30, the dye pixels printed on the receiver element 32, instead of being uniform in density, show a degree of non-uniformity. This indicates some degree of non-uniformity in the thermal reactivity of the dye at this intermediate power level. And of course, where full color prints are being made and dye donor elements of different colors (e.g., cyan, magenta and yellow) are used, this non-uniformity may be more pronounced. But by virtue of the present invention, this difficulty is obviated since the laser 12, when on, is always operated at optimum full-on power level. After an image has been fully printed on the surface 80 of the receiver element 32, using one or more dye donor elements 30 of different colors, the image is fused or heat bonded to the surface 80. This is advantageously done in accordance with the disclosure of U.S. Pat. application Ser. No. 722,788, filed Jun. 28, 1991, in the name of J. M. Kresock and having a common assignee with the present patent application.

In a laser printer system. 10, such as that shown in FIG. 1, which has been built and operated in accordance with the present invention, the laser 12 was a No LT40-82 diode laser, made by STC Optical Devices (British Telecom). The laser had a wavelength of 838 nm, and was operated at an optimum full-on power level about 60 mw. The laser drive 66 was provided in accordance with the laser manufacturer's specifications. The asynchronous load counter 60 was two 4-bit counters No. 74AC191 connected as a single 8-bit counter. The flip-flop 64 was a part No.74AC109, and the count divider 62 was a commercially available set to divide by "260". The master clock was operated at 36 MHz (though it could be operated as fast as 80 MHz). The dye pixels 88 were printed at a pitch of 4000 dots per inch and scan lines 86 were on a pitch of 2700 lines per inch. Density of the individual pixels varied in accordance with picture data words substantially linearly from 0 to 2.5 density units as accurately measured by a densitometer.

It is to be understood that the embodiments of apparatus and method described herein are illustrative of the general principles of the invention. Modifications may readily be devised by those skilled in the art without departing from the spirit and scope of the invention. For example, different sizes and pitches of dye pixels, and different pitches of scan lines may be used. The full-on power of laser 12 may be changed to a different optimum level depending on a particular dye donor element 30. The print digital data is not limited to a binary word or to 8-bits, nor the count divider limited to dividing by "260". Still further, the power-on durations of the laser may be linearly related to the print data by circuitry other than that specifically shown.

What is claimed is:

1. Thermal printing apparatus comprising:
    a laser for producing light spots;
    scanning means for scanning light spots along a line;
    positioning means for positioning a dye donor element and a closely adjacent receiver element to be scanned by the laser light spots, the dye donor element having a thermal power level above which the dye ablates and prints as dye pixels on the receiver element;
    circuit means for successively storing print data words and for determining intervals of time corresponding to the respective weighted value of each data word; and
    laser control and drive means for turning the laser on to an optimum full-on power level above the level at which dye of a donor element ablates, the circuit data means controlling the turning on and off of the laser control and drive means such that the laser is full-on for time intervals linearly related to the weighted values of the data words.

2. The apparatus of claim 1 wherein the circuit means comprises:
    counter means for successively storing print data words and for counting the weighted value of each word during an interval of time;
    clock means for applying clock signals to the counter means and for actuating the counter means to count the weighted value of each data word; and
    count divider means for providing pixel counts, the divider means being actuated by the clock means to divide down the clock signals by a number equal to or slightly larger than the maximum weighted number value of a data word such that a data word is fully loaded into the counter means by a pixel clock count and the counter means is then driven by a subsequent clock count and counts the word value before the next pixel count, and so on.

3. The apparatus of claim 2 wherein each data word is an 8-bit word, and the count divider divides by a number slightly larger than 256.

4. The apparatus of claim 1 wherein the laser control and drive means drives the laser when on at an optimum power level near the full power level of the laser.

5. Thermal printing apparatus comprising:
    a laser for producing a spot of light energy;
    scanning means for scanning the spot of light energy line-by-line over an image area;
    positioning means for positioning a dye donor element and a slide transparency to be printed on beneath the spot of light energy;
    asynchronous load counter means for successively storing print data words and for counting during a time interval of a sequence of clock counts the weighted value of each of the data words;
    clock means for applying high speed clock counts to the asynchronous load counter means;
    means for applying print data binary words to the asynchronous load counter means;
    count divider means driven by the clock means for generating pixel counts having a period much longer than the period of the clock counts as determined by the count divider; and
    laser driver means for driving the laser between a standby threshold level and an optimum full-on power level, the count divider means turning on the laser drive means and loading a data word into the asynchronous load counter means on each pixel count, the asynchronous load counter means counting the weighted value of the data word stored therein during a time interval proportional thereto, the asynchronous load counter turning off the laser drive means at the end of a word count, such that the laser is full-on for a time linearly proportional to the weighted value of each data word.

6. The apparatus of claim 5 further comprising means for applying line start signals to the count divider such that the laser spot of light energy is scanned line-by-line in synchronism with the turning on and off of the laser drive means.

7. The apparatus of claim 6 wherein the data words are of 8-bits, and the count divider divides by a number slightly greater than 256 and thereby provides at least one extra overhead count.

8. A thermal image laser printing system comprising:
    a laser for producing a spot of light energy;
    scanning means for scanning the spot of light energy line-by-line over an image area;
    a dye donor element and a receiver element to be printed on with pixels of dye with great accuracy by the spot of light energy;
    positioning means for positioning the dye donor and receiver elements beneath the spot of light energy;

counter means for successively storing print data words and for counting during a time interval of a sequence of high speed counts the weighted value of each of the data words;

clock means for applying clock counts to the counter means;

data means for applying print data words to the counter means;

count divider means driven by the clock means for generating pixel counts having a period much longer than the period of the clock counts as determined by the count divider; and laser driver means for driving the laser between a standby threshold level and an optimum full-on power level at which the dye of the donor element ablates and prints as dye pixels onto the receiver element, the count divider means turns the laser driver means full-on and loads a data word into the counter means on each pixel count, the counter means counts the weighted value of the data word stored therein during a time interval proportional thereto, the counter means turns off the laser driver means at the end of a word count such that the laser is full-on for a time linearly proportional to the weighted value of each data word and such that the dye pixels printed on the receiver element have a substantially linear tone scale over a wide range of densities and word values.

9. The system of claim 8 wherein the clock counts have a frequency in the range from about 20 MHz to about 80 MHz, and the count divider divides by a number at least equal to the weighted full binary value of the print data words.

10. The system in claim 8 wherein the laser driver means comprises a flip-flop, the flip-flop being turned on by a pixel count from the count divider, the flip-flop being turned off by the counter means at the end of its counting of each data word.

11. The system of claim 10 wherein the laser driver means drives the laser at an optimum power-on level of about 60 mw.

12. A method of thermally printing an image on a receiver element comprising the steps of:

positioning a dye donor element closely adjacent to a receiver element, the donor element having a dye coated surface facing an image receiving surface on the receiver element, the dye on the dye coated surface reacting above a certain energy level;

generating a laser beam and focusing it into a spot of light energy;

scanning the spot of light energy over the dye donor element; and rapidly turning on and off the laser beam in accordance with print data words, the laser beam when on being at an optimum power level at which dye under a light spot on the donor element reacts and prints as a dye pixel onto the receiver element, the laser beam being left on during printing of each dye pixel for a time linearly proportional to the weighted value of the data word corresponding to that dye pixel such that the tone scale of the printed dye pixels is substantially linear over a wide range of densities and data words.

13. A method of dye-transfer thermal printing of a high definition image onto a slide transparency comprising the steps of:

positioning a thin dye donor element closely adjacent to a blank slide transparency having a flat smooth image-surface area over which an image of photographic quality is to be printed, the dye donor element having a surface coated with a colored dye which is thermally reactive and which ablates above a certain thermal energy level, the dye surface being held separated very slightly from the image-surface area of the transparency;

generating a thermal laser beam and focusing it to a microscopically small spot of light energy;

scanning the small spot of light energy over the dye donor element to print finely detailed dye pixels on the image area of the transparency in accordance with print data words corresponding to a master image; and modulating the energy of the small light spot as it is being scanned by turning on the laser beam to an optimum power-on level at which a spot of dye beneath the light spot ablates and begins to transfer as a dye pixel to the image surface of the transparency, the laser beam being left on at the optimum power-on level during the printing of each dye pixel for a time corresponding to the weighted value of the respective data word for that pixel such that the tone scale of the printed dye pixels is substantially linear over a wide range of densities and data word values.

14. The method of claim 13 further comprising the step of heat fusing the image printed on the transparency to permanently bond them together.

15. The method of claim 13 further comprising the step of repeating the method of claim 13 several times with dye donor elements of different colors such that a high definition full color print is obtained.

16. The method of claim 13 wherein the thermal energy of the laser beam is obtained from a laser having a full-on power of about 60 mw and a wavelength of about 838 nm.

17. The method of claim 13 wherein the dye pixels are printed about 4000 per inch, and the laser beam is turned on and off at an average pixel frequency of about 140 KHz.

18. The method of claim 13 wherein the dye pixels printed on the slide transparency have a tone scale from 0 to 2.5 units of density substantially linearly related to the weighted values of the data words from zero to maximum.

19. A slide transparency produced by the method of claim 13.

20. A method of thermally printing a receiver element with an image of photographic quality, the method comprising the steps of:

positioning a dye donor element having a surface coated with a thin layer of colored dye closely adjacent to an image receiving surface of a blank receiver element, the dye being thermally reactive and ablating above a certain heat power level;

generating a laser beam having thermal power and focusing the beam to a microscopically small spot on the donor element, the thermal power of the light spot being set at an optimum value above the level at which the dye of the donor element ablates;

scanning the laser spot at high speed across the donor element; and turning on and off the laser beam in accordance with a pixel clock as the beam is being scanned to print very closely spaced pixels of dye on the receiver element in accordance with print data words corresponding to the colors and tone values of the pixels of a master image, the time the laser beam is on during each pixel clock count interval being determined by the respective data words such that the density of each printed dye pixel on the receiver element corresponds substantially linearly to the weighted value of the respective data word.

21. The method of claim 20 further comprising the step of repeating the method of claim 20 with several donor elements having dyes of different colors, such that a full color image with a substantially linear tone scale is produced.

22. A receiver element with a color image made by the method of claim 21.

* * * * *